(12) United States Patent
Basso et al.

(10) Patent No.: US 8,432,147 B2
(45) Date of Patent: Apr. 30, 2013

(54) METHOD OF FORMING A SWITCHING REGULATOR AND STRUCTURE THEREFOR

(75) Inventors: Christophe Basso, Pibrac (FR); Nicolas Cyr, Phoenix, AZ (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 245 days.

(21) Appl. No.: 12/995,120

(22) PCT Filed: Jul. 23, 2008

(86) PCT No.: PCT/US2008/070874
§ 371 (c)(1),
(2), (4) Date: Nov. 29, 2010

(87) PCT Pub. No.: WO2010/011219
PCT Pub. Date: Jan. 28, 2010

(65) Prior Publication Data
US 2011/0110124 A1    May 12, 2011

(51) Int. Cl.
*G05F 1/40* (2006.01)
*H02M 3/335* (2006.01)

(52) U.S. Cl.
USPC ........................................ 323/282; 363/21.01

(58) Field of Classification Search ................ 363/20, 363/21.02, 95, 97, 131; 323/275, 282, 273, 323/285
See application file for complete search history.

(56) References Cited

U.S. PATENT DOCUMENTS

| | | |
|---|---|---|
| 5,892,355 A | 4/1999 | Pansier et al. |
| 6,351,398 B1 | 2/2002 | Balakrishnan et al. |
| 6,771,357 B1 | 8/2004 | Inukai |
| 6,833,692 B2 | 12/2004 | Balakrishnan et al. |
| 6,906,934 B2 | 6/2005 | Yang et al. |
| 7,109,696 B2 | 9/2006 | Balakrishnan et al. |
| 7,215,107 B2 | 5/2007 | Djenguerian et al. |

*Primary Examiner* — Adolf Berhane
(74) *Attorney, Agent, or Firm* — Robert F. Hightower

(57) ABSTRACT

In one embodiment, a power supply controller is configured to receive a sense signal (CS) having a negative value that is proportional to the input voltage. The power supply controller uses the sense signal to limit the switch (27) current through the switch responsively to the value of the input voltage.

17 Claims, 5 Drawing Sheets

US 8,432,147 B2

1

METHOD OF FORMING A SWITCHING REGULATOR AND STRUCTURE THEREFOR

BACKGROUND OF THE INVENTION

The present invention relates, in general, to electronics, and more particularly, to semiconductor structures and methods of forming semiconductor devices.

In the past, the semiconductor industry utilized various methods and structures to form switching power supply controllers that were used to form power supplies that provided a regulated output voltage. One advantageous feature was to limit the output power of the switching power supply in response to the current through the power switch of the power supply. An example of such a configuration was described in U.S. Pat. No. 7,215,107 which issued to Djenguerian et al. on May 8, 2007. There generally was a propagation delay from the time the current reached the desired peak value and the time that the switch was actually turned off in response to the current. This propagation delay resulted in an actual peak current that was greater than the desired peak value. In some embodiments, the current was limited based on the amount of time required for the current to change from a first value to a second value. However, determining the time interval and the rate of change required complex circuitry that increased the cost of the power supply controller. Additionally, it was difficult to accurately determine the time interval which resulted in inaccuracies in the output voltage.

Accordingly, it is desirable to have a power supply controller that more accurately limits the power delivered to load, and that has a lower cost.

For simplicity and clarity of the illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, or certain N-type or P-type doped regions, a person of ordinary skill in the art will appreciate that complementary devices are also possible in accordance with the present invention. It will be appreciated by those skilled in the art that the words during, while, and when as used herein relating to circuit operation are not exact terms that mean an action takes place instantly upon an initiating action but that there may be some small but reasonable delay, such as a propagation delay, between the reaction that is initiated by the initial action. The use of the word approximately or substantially means that a value of an element has a parameter that is expected to be very close to a stated value or position. However, as is well known in the art there are always minor variances that prevent the values or positions from being exactly as stated. It is well established in the art that variances of up to at least ten percent (10%) (and up to twenty percent (20%) for semiconductor doping concentrations) are reasonable variances from the ideal goal of exactly as described.

DETAILED DESCRIPTION OF THE DRAWINGS

Figure 1:
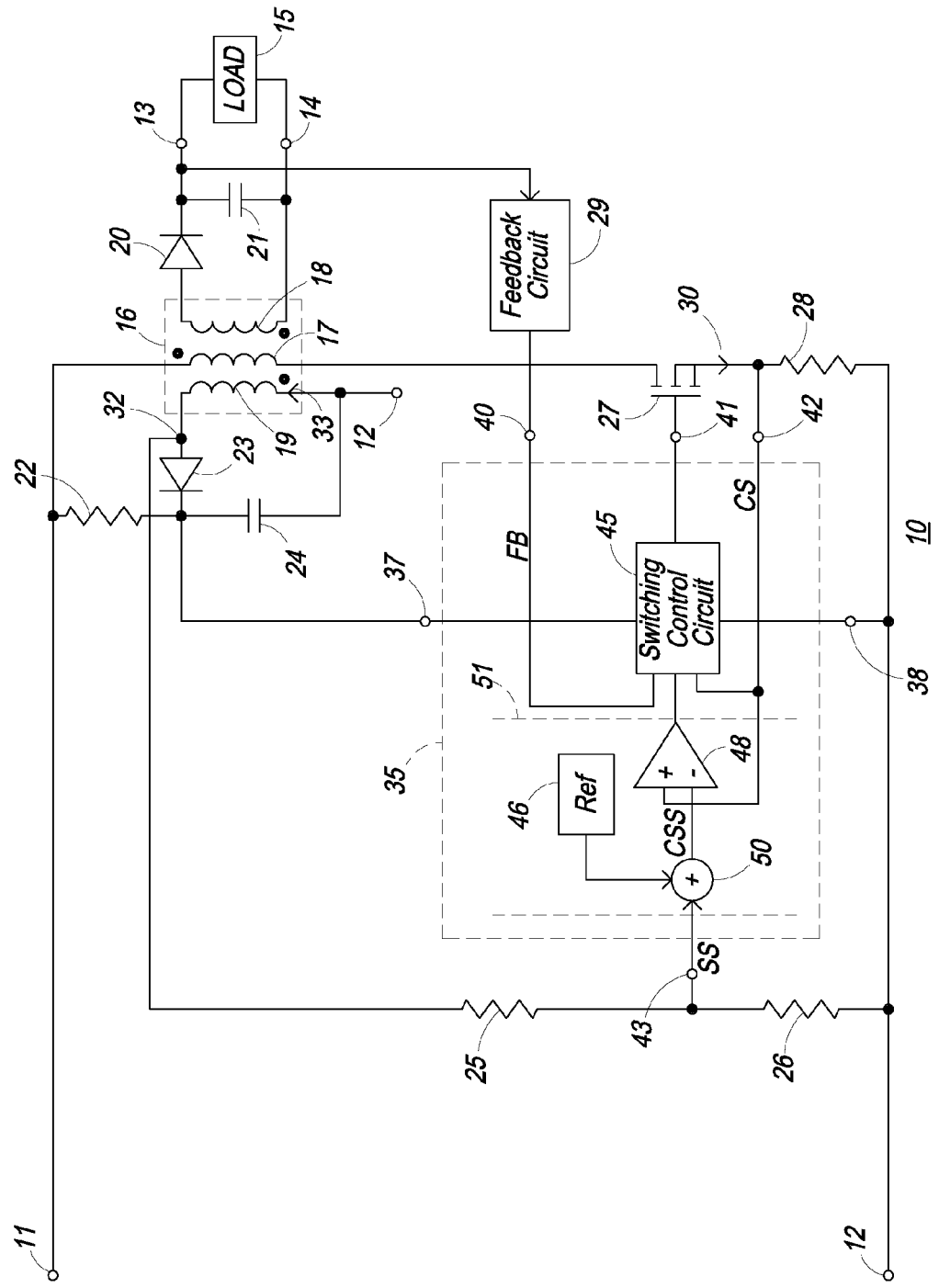
FIG. 1 schematically illustrates an embodiment of a portion of a power supply system that includes an exemplary embodiment of a portion of a power supply controller in accordance with the present invention.

FIG. 1 schematically illustrates an embodiment of a portion of a power supply system 10 which includes an exemplary embodiment of a power supply controller 35. System 10 receives power between a voltage input terminal 11 and a common reference terminal 12, and supplies an output voltage between an output 13 and an output return 14. The input voltage received between terminals 11 and 12 generally is referenced to a common reference voltage that is formed at terminal 12. The output voltage usually is regulated to a desired value or target value within a range of values around the target value. For example, the target value may be five volts (5V) and the range of values may be plus or minus five percent (5%) around the five volts. System 10 usually includes a transformer 16 that has a primary winding 17, a secondary winding 18, and an auxiliary winding 19. A power switch, such as a transistor 27, is used to control the value of a switch current 30 that flows through winding 17 and transistor 27 in order to regulate the value of the output voltage. A current sense element, such as a sense resistor 28, is used to form a current sense (CS) signal that is representative of switch current 30. Those skilled in the art will appreciate that other well-known current sense elements may be used instead of resistor 28. Current 30 determines the amount of output current that is supplied to a load that includes capacitor 21 and a load 15 that is connected between output 13 and return 14. As will be seen further hereinafter, power supply controller 35 is configured to sense the value of the input voltage and to control the peak value of current 30 through the power switch, thus, the peak value of the output current supplied to the load that includes capacitor 21 and load 15, responsively to the value of the input voltage. Such control of the peak value of current 30 also results in supplying a substantially constant value of power to output 13 for a given value of the feedback signal, even though the value of the input voltage may vary.

A diode 20 usually is connected to winding 18 along with a capacitor 21 to assist in forming the output voltage between output 13 and return 14. A feedback circuit 29 provides a feedback (FB) signal that is representative of the value of the output voltage. Feedback circuit 29 may be any of a variety of well-known feedback circuits such as an optical coupler that provides isolation between the primary and secondary sides of transformer 16 and system 10. Auxiliary winding 19 is utilized to provide an auxiliary voltage for operating controller 35. A diode 23, a capacitor 24, and a resistor 22 assist in forming the auxiliary voltage from the voltage and current induced into winding 19. The auxiliary winding circuit formed by winding 19, diode 23, and capacitor 24 is a well-known auxiliary winding power supply circuit.

Controller 35 is configured to receive the auxiliary voltage for operating controller 35 between a voltage input 37 and a voltage return 38. Voltage input 37 generally is connected to capacitor 24 in order to receive the auxiliary voltage, and return 38 generally is connected to common reference terminal 12 in order to receive the common reference voltage. Controller 35 is also configured with a feedback (FB) input 40 that receives the feedback (FB) signal from feedback circuit 29, a drive output 41 that is configured to provide a switching drive signal for operating transistor 27, and a current sense (CS) input 42 that is configured to receive the current sense (CS) signal. A sense input 43 of controller 35 is configured to receive a sense voltage as a sense signal (SS) that is representative of the value of the input voltage on terminal 11 relative to the common reference voltage on terminal 12. Controller 35 also includes a switching control circuit 45 and a current compensation circuit 51. Switching control circuit 45 may be any of a variety of well-known switching control circuits that are utilized for switching power supply controllers. For example, circuit 45 may be a PWM control circuit, a PFM control circuit, or a hysteretic switching control circuit.

Figure 2:
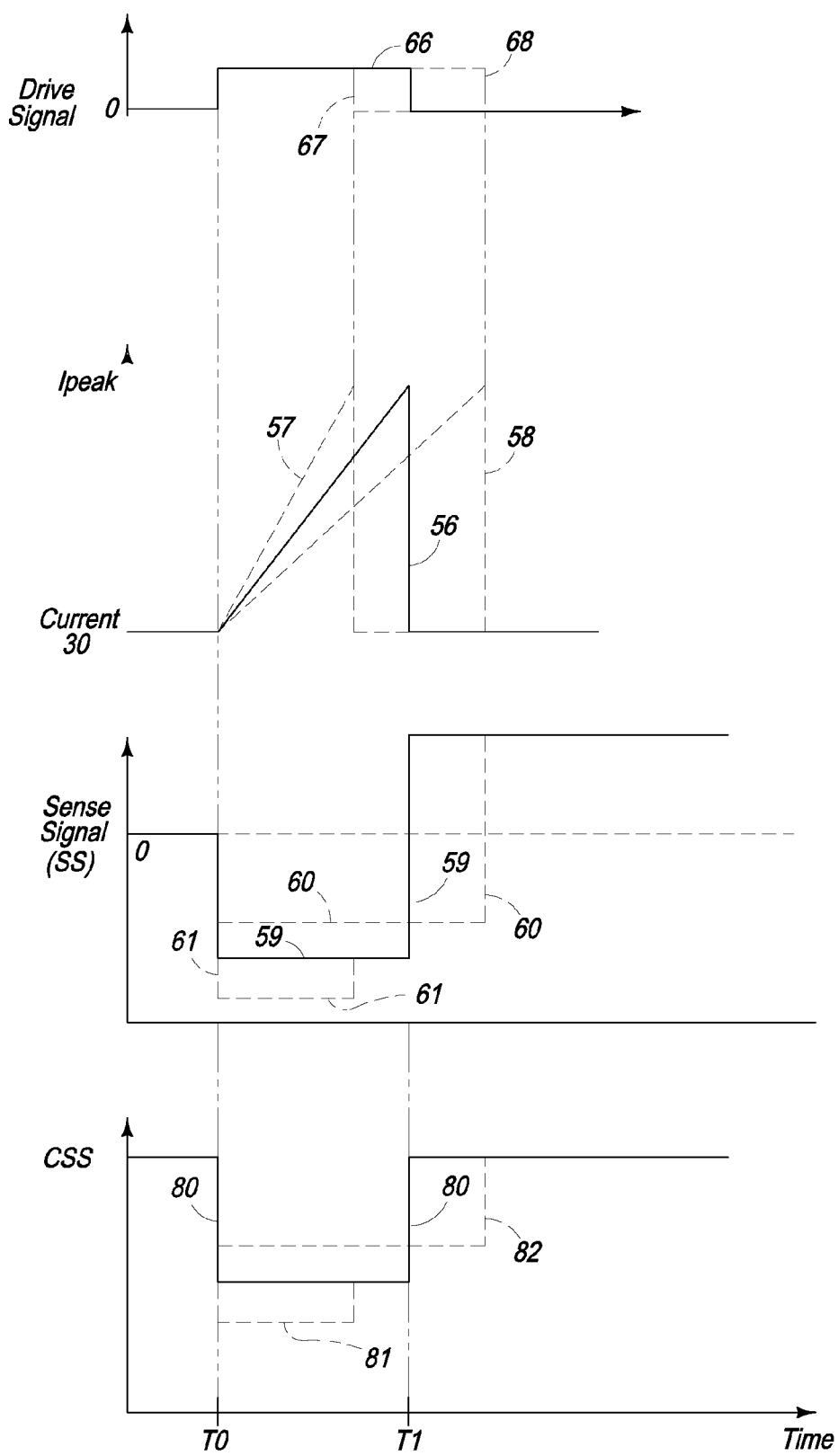
FIG. 2 is a graph illustrating some of the signals formed by the operation of the power supply system of FIG. 1 in accordance with the present invention.

FIG. 2 is a graph having plots that illustrate some of the signals formed within system 10 during the operation of controller 35. The abscissa indicates time and the ordinate indicates increasing value of the illustrated signal. A plot 66 illustrates the nominal waveform of the switching drive signal formed on output 41. A plot 56 illustrates the nominal value of current 30, and a plot 59 illustrates the nominal value of the sense signal (SS) received on input 43 relative to the common reference voltage on terminal 12. A plot 80 illustrates a nominal value of a compensated signal (CSS) that is formed by circuit 51. This description has references to FIG. 1 and FIG. 2.

During the operation of controller 35, switching control circuit 45 asserts the switching drive signal, as illustrated by plot 66 at a time T0, to enable transistor 27. The switching drive signal usually is high during the on-time portion of a cycle of the switching drive signal as illustrated by plot 66. Enabling transistor 27 causes current 30 to flow through winding 17, transistor 27, and resistor 28. Current 30 flowing through winding 17 attempts to induce a current 33 to flow through winding 19. However, diode 23 prevents the flow of current 33 which induces a voltage at a node 32 that is negative relative to the common reference voltage on terminal 12. The absolute value of the negative voltage on node 32 is proportional to the value of the input voltage on terminal 11 relative to terminal 12. The proportion generally is related by the turns ratio between windings 17 and 19. A resistor divider of resistors 25 and 26 forms a voltage as the sense signal (SS) on input 43 as illustrated by plot 59. The sense signal (SS) is proportional to, thus representative of, the input voltage but is negative relative to the common reference voltage on terminal 12.

Current compensation circuit 51 is used to control the peak value of current 30 responsively to the value of the input voltage in order to control the maximum value of power supplied by system 10. Without circuit 51, if the value of the input voltage increased the slope of current 30 would increase and the peak value of current 30 could increase past the nominal peak value before circuit 45 could terminate current 30. Circuit 51 is configured to control the duration of the on-time portion of the drive signal responsively to the value of the input voltage in order to limit the peak value of current 30 responsively to the value of the input voltage. Circuit 51 receives the sense signal (SS) and the current sense (CS) signal and uses the sense signal to adjust or compensate the peak value of switch current 30 through the power switch responsively to the value of the input voltage. The exemplary embodiment of circuit 51 illustrated in FIG. 1 includes an adder circuit 50, a comparator 48, and a reference generator or reference circuit or ref 46. In the configuration of this exemplary embodiment, adder circuit 50 sums the sense (SS) signal from input 43 with the reference voltage from ref 46 to form the compensated signal (CSS). The value of the compensated signal (CSS) is compared to the value of the current sense (CS) signal to form a disable signal on the output of comparator 48. When the value of the current sense (CS) signal becomes greater than the value of the compensated signal (CSS), the output of comparator 48 goes high. As will be seen further hereinafter, switching control circuit 45 uses this disable signal to terminate the on-time portion of a cycle of the switching drive signal thereby disabling transistor 27 and terminating current 30.

Typically, the values of resistors 25 and 26 are chosen so that the sense (SS) signal formed on input 43 has the nominal value at the nominal value of the input voltage and gives a desired or nominal peak value for current 30 as illustrated by plot 56. For example, system 10 may be designed such the nominal value of the input voltage received between terminals 11 and 12 is about three hundred twenty five volts (325V) and may have a high value of about three hundred seventy five volts (375V) and a low value of about one hundred volts (100V). The corresponding nominal value of the sense signal may be about minus two hundred sixty milli-volts (−260 mV) while the high value may be about minus three hundred milli-volts (−300 mV) and the low value may be about minus eighty milli-volts (−80 mV). When transistor 27 is enabled and the input voltage is at the nominal value, the selected value of resistors 25 and 26 form the sense signal at the nominal value, which is negative relative to the common reference voltage, as illustrated by plot 59. This nominal value of the sense signal is added to the reference voltage from ref 46 to form a nominal value of the compensated (CSS) signal. Since the value of the sense (SS) signal is negative, it causes the compensated (CSS) signal to be less than the value of the reference voltage as illustrated by plot 80 such as at a time T0. When the value of the current sense (CS) signal reaches the value of the compensated (CSS) signal, the output of comparator 48 goes high and circuit 45 terminates the on-time portion of the current cycle of the drive signal (as illustrated by plot 66 at a time T1) thereby terminating current 30 at the nominal peak value as illustrated by plot 56 at time T1.

When transistor 27 is disabled, the energy stored in winding 17 induces a positive voltage at node 32 and current flows from terminal 12 through diode 23 to charge capacitor 24 and form the auxiliary voltage. The positive voltage at node 32 forms the sense signal to have a positive voltage relative to the value of the common reference voltage on terminal 12 as illustrated by plot 59 after time T1. Since circuit 45 has disabled transistor 27, this positive value of the compensated signal has no effect on the operation of circuit 45.

When transistor 27 is enabled and the input voltage is greater than the nominal value (a high value), current 30 increases at a greater rate, thus with a steeper slope, as illustrated by a dashed plot 57. Because the value of the input voltage is increased, the absolute value of the sense signal is greater than it was at the nominal value, thus the sense signal is more negative, as illustrated by a dashed plot 61. Thus, circuit 51 forms the compensated (CSS) signal to have a lower value than the nominal value of the compensated (CSS) signal as illustrated by a dashed plot 81. Because of the decreased value of the compensated signal, the current sense (CS) signal crosses the value of the compensated signal earlier in the cycle of the drive signal which terminates the on-time portion of the drive signal earlier in the drive signal cycle thereby causing transistor 27 to be disabled earlier in the cycle than it would be for the nominal value of the input voltage as illustrated by a dashed plot 67. Because of the steeper slope of current 30, decreasing the value of the reference signal, formed as the compensated signal, that is used to begin terminating current 30 causes the resulting peak value of current 30 to be substantially equal to the nominal value of the peak current. Without changing the value of the reference signal responsively to the input voltage, the steeper slope of current 30 would result in the peak value being greater than the nominal peak value. Thus, the peak value of current 30 is controlled responsively to the increased value of the input voltage. Since current 30 increased at a faster rate due to the greater value of the input voltage, the amount of power delivered to output 13 is the substantially the same as the amount of power delivered for the nominal value of the input voltage.

When transistor 27 is enabled and the input voltage is less than the nominal value, current 30 increases at a slower rate, thus with a lower slope, as illustrated by a dashed plot 58. This forms the absolute value of the sense signal to be less than it was at the nominal value as illustrated by a dashed plot 60. Since the sense signal is negative, the decreased value of the sense signal causes the compensated signal to be greater than nominal value of the compensated signal as illustrated by a dashed plot 82. Because of the increased value of the compensated signal, the current sense (CS) signal crosses the value of the compensated (CSS) signal later in the cycle of the drive signal which terminates the on-time portion of the drive signal later in the drive signal cycle thereby causing transistor 27 to be disabled later in the cycle than it would be for the nominal value of the input voltage as illustrated by a dashed plot 68. Because of the lower slope of current 30, increasing the value of the reference signal that is used to begin terminating current 30 causes the resulting peak value of current 30 to be substantially equal to the nominal value of the peak current. Without changing the value of the reference signal responsively to the input voltage, the lower slope of current 30 would result in the peak value being less than the nominal peak value. Thus, circuit 51 is configured to adjust the peak value of the switch current responsively to changes in the input voltage to supply a substantially constant peak value of current 30 to output 13 for a given value of the feedback signal. Since current 30 increased at a slower rate, the amount of power delivered to output 13 is substantially the same as for the nominal value of the input voltage.

Figure 3:
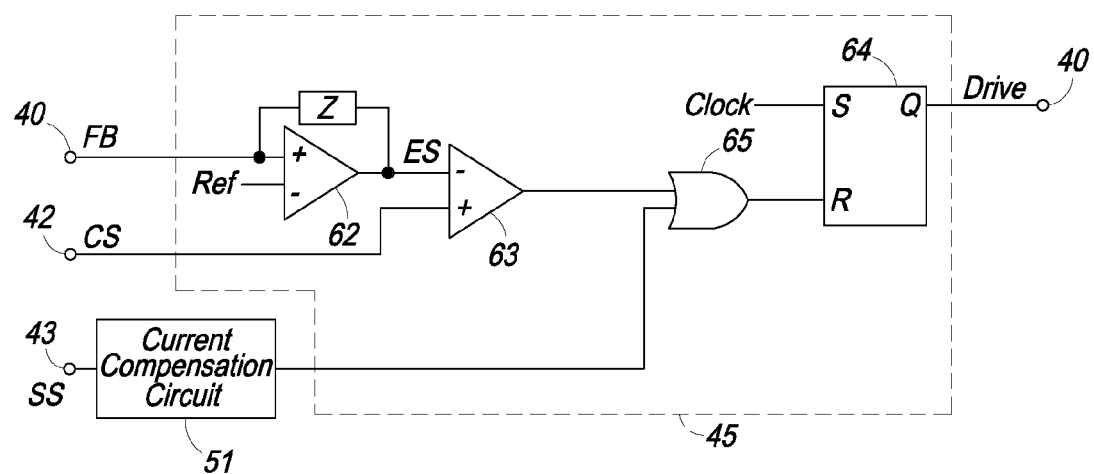
FIG. 3 schematically illustrates a more detailed portion of an embodiment of another portion of the power supply controller of FIG. 1 in accordance with the present invention.

FIG. 3 schematically illustrates an exemplary embodiment of a portion of switching control circuit 45. In this exemplary embodiment, an error amplifier 62 of switching control circuit 45 receives the feedback signal and forms an error signal (ES) that is representative of the difference between a desired value of the output voltage and the actual value of the output voltage. As is well known in the art, error amplifier 62 generally includes frequency compensation components, such as an impedance Z, that are used to provide frequency compensation for the closed control loop formed by controller 35. A comparator 63 compares the error signal to the current sense signal in order to control the operation of transistor 27 under normal operating conditions. An OR gate 65 receives the compensated signal (CSS) and resets latch 64 to disable transistor 27 and terminate current 30 to limit the peak value of current 30 responsively to the value of the input voltage.

For clarity of the explanation, the operation of the preferred embodiment of controller 35 is explained, however, other embodiments should provide similar operation. Those skilled in the art will appreciate that other implementations may be used for circuit 45. For example, error amplifier 62 could be external to controller 35 and the output of the error amplifier could replace the FB signal. In another example of an alternate embodiment, the current sense signal into circuit 45 could be replaced with a ramp signal generated by a ramp generator circuit.

Figure 4:
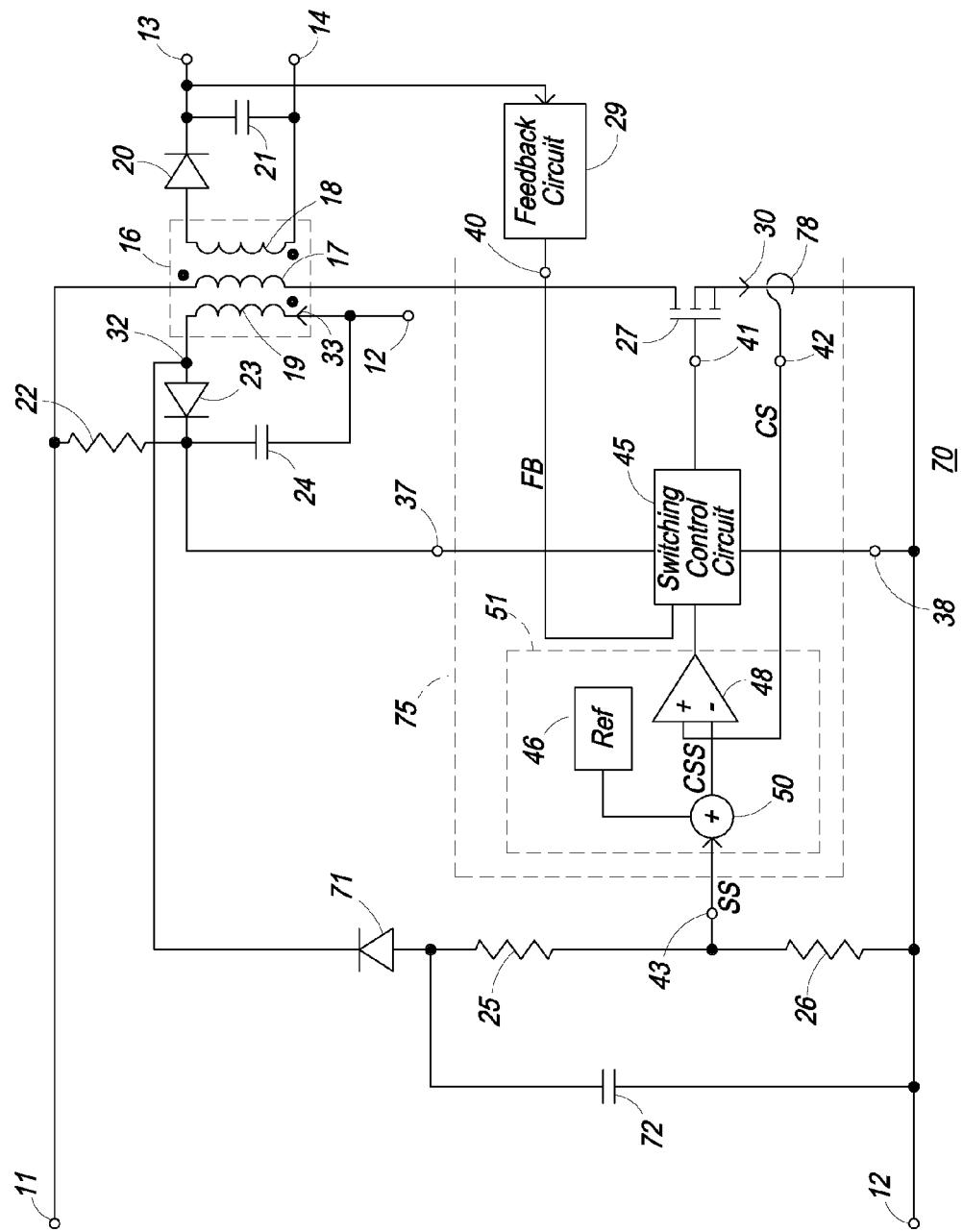
FIG. 4 schematically illustrates an embodiment of a portion of another power supply system that includes an exemplary embodiment of a portion of another power supply controller that is an alternate embodiment of the power supply controller of FIG. 1 in accordance with the present invention.

FIG. 4 schematically illustrates an embodiment of a power supply system 70 that is an alternate embodiment of power supply system 10 that was explained in the description of FIG. 1-FIG. 4. System 70 is similar to system 10 except that a diode 71 and a capacitor 72 are utilized to assist in forming the sense signal on input 43. Additionally, system 70 utilizes a power supply controller 75 instead of controller 35 of FIG. 1. Controller 75 is similar to controller 35, but controller 75 includes the power switch, such as power transistor 77, that is formed on the same semiconductor die as switching control circuit 45 and circuit 51. Additionally, controller 75 includes a current sense circuit 78, such as a shunt regulator, that is utilized to sense the value of current 30 to form the current sense signal. Such current sense elements are well known to those skilled in the art.

In an alternate embodiment and because controller 75 is integrated to include the power switch and current sense circuit 78, it may be advantageous to used a constant negative voltage to replace the sense signal. The constant negative voltage causes controller 75 to control the peak value of current 30 to a substantially fixed value.

Figure 5:
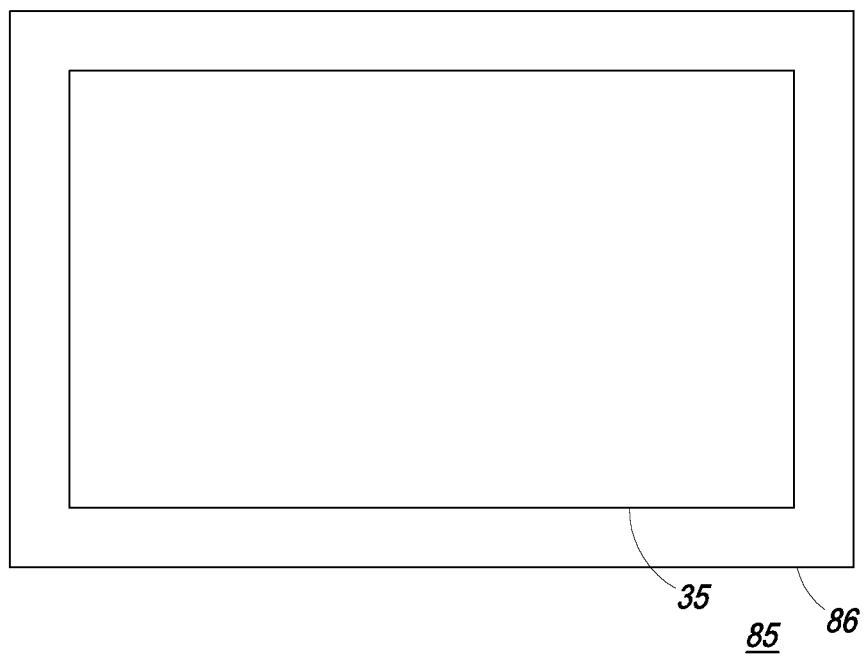
FIG. 5 illustrates an enlarged plan view of a semiconductor device that includes the power supply controller of FIG. 1 in accordance with the present invention.

FIG. 5 illustrates an enlarged plan view of a portion of an embodiment of a semiconductor device or integrated circuit 85 that is formed on a semiconductor die 86. Controller 35 or controller 75 is formed on die 86. Die 86 may also include other circuits that are not shown in FIG. 5 for simplicity of the drawing. Controller 35 and device or integrated circuit 85 are formed on die 86 by semiconductor manufacturing techniques that are well known to those skilled in the art.

In view of all of the above, it is evident that a novel device and method is disclosed. Included, among other features, is forming the power supply controller to receive a negative sense voltage that is representative of the input voltage and to limit a peak value of the current through the power switch responsively to the value of the input voltage. Using a negative voltage facilitates offsetting the current sense signal using voltages without having to make a current to voltage translation of the input voltage. This improves accuracy by eliminating at least one current to voltage translation circuit. Additionally, fewer components and circuitry are used which reduces the costs of the power supply controller. Forming the negative voltage from a signal that is representative of the input voltage instead of using the input voltage directly reduces the amount of power used by the circuit that forms the sense signal. The fewer components also improve the accuracy which results in limiting the peak value of current 30 to substantially the nominal value even if the input voltage varies. Using voltage to form the sensing function without using a voltage to current conversion improves the accuracy.

While the subject matter of the invention is described with specific preferred embodiments, it is evident that many alternatives and variations will be apparent to those skilled in the semiconductor arts. The word "connected" is used throughout for clarity of the description, however, it is intended to have the same meaning as the word "coupled". Accordingly, "connected" should be interpreted as including either a direct connection or an indirect connection. Although the subject matter of the invention is described using an exemplary embodiment of a fixed frequency flyback power supply controller, the invention is applicable to other power supply configurations.

The invention claimed is:

1. A switching regulator comprising:
   a first circuit configured to form a switching drive signal that is used to operate a switch and in order to control a switch current that flows through the switch in order to regulate an output voltage to a desired value wherein the output voltage is formed from an input voltage that has a positive value relative to a common reference value of the input voltage;
   a current compensation circuit;
   a first input of the current compensation circuit configured to receive a current sense signal that is representative of the switch current that flows through the switch;
   a second input of the current compensation circuit configured to receive a sense voltage that is proportional to the input voltage wherein the sense voltage is negative relative to the common reference value of the input voltage; and
   the switching regulator configured to use the sense voltage to control a peak value of the switch current to a substantially constant value responsively to the input voltage.

2. The switching regulator of claim 1 wherein the current compensation circuit is configured to sum the sense voltage with a reference voltage to form a compensated signal wherein the current compensation circuit uses the compensated signal to form a control signal that is used to terminate an on-time portion of the switching drive signal.

3. The switching regulator of claim 2 further including comparing the compensated signal to the current sense signal to form the control, signal.

4. The switching regulator of claim 1 wherein the current compensation circuit includes a summing circuit to sum the sense voltage with a reference voltage to form a compensated signal.

5. The switching regulator of claim 4 wherein the current compensation circuit includes a comparator coupled to receive the compensated signal and the current sense signal and responsively form a control signal that is used to terminate an on-time portion of the switching drive signal.

6. The switching regulator of claim 1 further including configuring the switching regulator to receive a feedback signal that is representative of the output voltage, to use the feedback signal to form an error voltage representing a deviation of the output voltage from the desired value, and to compare the error voltage to the compensated signal to limit the switch current through the switch.

7. The switching regulator of claim 1 wherein the current sense signal is a voltage.

8. A method of forming a switching regulator comprising:
   configuring the switching regulator to form a switching drive signal that is used to operate a switch and control a switch current that flows through the switch in order to regulate an output voltage to a desired value wherein the output voltage is formed from an input voltage that has a positive value relative to a common reference value of the input voltage;
   configuring the switching regulator to receive a sense signal that is proportional to the input voltage wherein the sense signal is negative relative to the common reference value of the input voltage; and
   operably coupling the switching regulator to use the sense signal to limit a peak value of the switch current responsively to the input voltage.

9. The method of claim 8 wherein operably coupling the switching regulator to use the sense signal includes configuring the switching regulator to use the sense signal to adjust a duration of an on-time portion of a cycle of toe switching drive signal.

10. The method of claim 9 wherein operably coupling the switching regulator to use the sense signal includes configuring the switching regulator to sum the sense signal with a reference signal to form a compensated sense signal and to limit a peak value of the switch current responsively to the compensated sense signal.

11. The method of claim 10 wherein configuring the switching regulator to sum the sense signal further includes operably coupling the switching regulator to compare the compensated sense signal to a current sense signal that is representative of the switch current.

12. The method of claim 11 wherein operably coupling the switching regulator to use the sense signal includes configuring the switching regulator to receive a feedback signal that is representative of the output voltage, to use the feedback signal to form an error signal that is representative of a deviation of the output voltage from a desired value, and to compare the error signal to the compensated sense signal.

13. A switching regulator comprising:
   the switching regulator configured to form a switching drive signal that is used to operate a switch wherein the switch is configured to receive an input voltage having a positive value relative to a common reference and wherein the switching drive signal is formed to control a switch current that flows through the switch in order to regulate an output voltage to a desired value wherein the output voltage is formed from the input voltage;
   a first circuit of the switching regulator operably coupled to receive a current sense signal that is representative of the switch current;
   the first circuit configured to receive a sense signal that is negative relative to the common reference of the input voltage; and
   the switching regulator configured to use the sense signal to control a peak value of the switch current responsively to the sense signal.

14. The switching regulator of claim 13 wherein an absolute value of the sense signal is proportional to a value of the input voltage.

15. The switching regulator of claim 13 wherein the first circuit is configured to sum the sense signal with a reference signal to form a compensated sense signal.

16. The switching regulator of claim 15 wherein the first circuit is configured to compare the compensated sense signal to the current sense signal to form a control signal.

17. The switching regulator of claim 16 wherein a PWM circuit of the switching regulator is configured to use the control signal to form a duration of the switching drive signal.

* * * * *